United States Patent
Sivasankar et al.

(10) Patent No.: US 11,783,133 B2
(45) Date of Patent: Oct. 10, 2023

(54) SUPERVISED MACHINE LEARNING FOR AUTOMATED ASSISTANTS

(71) Applicant: Teachers Insurance and Annuity Association of America, New York, NY (US)

(72) Inventors: Prem Kumar Sivasankar, Concord, NC (US); Vamsi Pola, Concord, NC (US); Francis McGovern, Wrentham, MA (US); Charles Gregory Starnes, Clover, SC (US); Zsa-Zsa Porter, Mint Hill, NC (US); Tasneem Hajara, Hillsborough, NJ (US); Jennifer Adelhardt, Waxhaw, NC (US); Daniel J. Gibbons, Mooresville, NC (US); Scott Blandford, Hopewell, NJ (US); Michael Ilfeld, Charlotte, NC (US); Peter Tsahalis, Colts Neck, NJ (US); Justin Meyer, Indian Trail, NC (US); James Titus, Garland, TX (US); Alysce Balbuena, Mount Holly, NC (US); Mehul Shah, Mumbai (IN); Jeffrey Scola, Charlotte, NC (US); Heather H. Gordon, Asheville, NC (US); Claudette Grose, Concord, NC (US); Reena T. Khatwani, Bridgewater, NJ (US); Reetu Sharma, Mumbai (IN); Lisa R. Weil, Sudbury, MA (US)

(73) Assignee: Teachers Insurance and Annuity Association of America, New York, NY (US)

( * ) Notice: Subject to any disclaimer, the term of this patent is extended or adjusted under 35 U.S.C. 154(b) by 18 days.

(21) Appl. No.: 16/923,795

(22) Filed: Jul. 8, 2020

(65) Prior Publication Data
US 2021/0365834 A1  Nov. 25, 2021

(30) Foreign Application Priority Data

May 23, 2020 (IN) ............................. 202041021738

(51) Int. Cl.
*G06N 20/00* (2019.01)
*G06F 40/30* (2020.01)
(Continued)

(52) U.S. Cl.
CPC ............ *G06F 40/30* (2020.01); *G06F 18/217* (2023.01); *G06F 18/22* (2023.01); *G06F 18/24* (2023.01); *G06F 40/35* (2020.01); *G06N 20/00* (2019.01)

(58) Field of Classification Search
CPC ..... G10L 15/22; G10L 15/1815; G10L 15/26; G10L 2015/223; G10L 15/063;
(Continued)

(56) References Cited

U.S. PATENT DOCUMENTS

| 2003/0158947 A1* | 8/2003 | Bloch ................. G06F 16/9574 709/227 |
| 2007/0033005 A1* | 2/2007 | Cristo ................... G06F 16/335 707/E17.059 |

(Continued)

*Primary Examiner* — Luis A Sitiriche
(74) *Attorney, Agent, or Firm* — Lowenstein Sandler LLP

(57) ABSTRACT

Disclosed are methods and systems for supervised machine learning for automated assistants. An example method includes: receiving an automated assistant transcript comprising a plurality of records, wherein each record of the plurality of records comprises a query, a classification of the query, an intent associated with the query, and a responsive action associated with the intent; receiving, via a graphical user interface (GUI), a user input indicating an approval of a new automated assistant transcript record; comparing the new automated assistant transcript record to one or more records of the plurality of records; and responsive to detecting a conflict of the new automated assistant transcript (Continued)

record with one or more records of the plurality of records, displaying, via the GUI, a notification of the conflict.

20 Claims, 7 Drawing Sheets

(51) Int. Cl.
*G06F 40/35* (2020.01)
*G06F 18/22* (2023.01)
*G06F 18/24* (2023.01)
*G06F 18/21* (2023.01)

(58) Field of Classification Search
CPC ....... G10L 15/16; G10L 21/06; G10L 15/222; G10L 2015/227; G10L 15/1822; G10L 15/30; G10L 2015/0635; G10L 2015/088; G10L 25/63; G10L 25/90; G10L 17/00; G10L 17/005; G06F 3/167; G06F 16/3329; G06F 40/295; G06F 40/40; G06F 40/35; G06F 16/3331; G06F 16/3344; G06F 16/9535; G06F 16/9537; G06F 3/0482; G06F 40/56; G06F 9/468; G06F 9/54; G06F 16/00; G06F 16/248; G06F 16/285; G06F 16/3326; G06F 16/338; G06F 16/345; G06F 16/90335; G06F 16/951; G06F 3/0484; G06F 3/04817; G06F 3/04842; G06F 40/169; G06F 9/453; G06F 16/24575; G06F 16/24578; G06F 17/2765; G06F 1/3231; G06F 40/20; G06F 40/211; G06F 40/253; G06F 40/268; G06F 40/279; G06F 40/30; G06F 9/451; G06F 9/5005; G06F 9/541; G06Q 10/107; G06Q 10/00; G06Q 10/1093; G06Q 10/06; G06Q 10/10; H04L 51/02; H04L 67/146; H04L 67/148; H04L 65/403; H04L 12/1822; H04L 12/1831; H04L 65/1093; H04L 67/36; H04L 12/1813; H04L 12/1827; H04L 51/16; H04L 65/4038; H04L 67/14; H04L 67/142; H04L 67/22; H04M 2203/256; H04M 3/42382; H04M 3/5183; H04M 3/523; H04M 1/6033; H04M 2201/40; H04M 2203/5009; H04M 2203/5027; H04M 2250/62; H04M 3/4936; H04M 3/527; G06N 3/006; G06K 9/00288; H04N 7/15; H04N 7/147; H04N 7/155
See application file for complete search history.

(56) References Cited

U.S. PATENT DOCUMENTS

| | | | |
|---|---|---|---|
| 2009/0171956 A1* | 7/2009 | Gupta | G06F 16/35 |
| | | | 707/999.102 |
| 2017/0351677 A1* | 12/2017 | Chaubal | G06F 16/248 |
| 2018/0131645 A1* | 5/2018 | Magliozzi | G06F 40/30 |
| 2019/0043239 A1* | 2/2019 | Goel | G10L 19/00 |
| 2019/0362017 A1* | 11/2019 | Salomon | G06N 5/02 |

* cited by examiner

☩ Terry Jones
Supervised Machine Learning Workbench - Session ID 53501637

FOR INTERNAL USE ONLY 🖶 FORMAT FOR PRINT

You can edit the Topic, Subtopic, or Intent of a record before approving or rejecting it. At least one record must be approved to start Training.

Pending (14) | Approved (0) | Rejected (0)

| Query Date | User Input | Topic | Topic Score | Subtopic | Subtopic Score | Intent | Intent Score | Actions |
|---|---|---|---|---|---|---|---|---|
| 8/23/2018, 3:09:44 AM | Can I change my repayment method? | Actions | 83 | Loan Repayment Methods | 80 | Change bank Answer ⓘ | 96 | Reviewing Actions ▾ |
| 8/21/2018, 11:05:45 AM | How do I change my repayment method? | Actions | 83 | Loan Repayment Methods | 80 | Change bank Answer ⓘ | 96 | Reviewing Actions ▾ |
| 8/23/2018, 8:55:44 AM | What if I change my mind after requesting a loan, and need to change something (the amount, the term, etc.)? | Actions | 83 | Loan Requests | 85 | Change Answer ⓘ | 83 | Reviewing Actions ▾ |
| 8/22/2018, 3:38:44 AM | What if I change my mind after requesting a loan, and no longer want the loan? | Actions | 83 | Loan Requests | 85 | Change Answer ⓘ | 83 | Reviewing Actions ▾ |
| 8/21/2018, 10:37:45 AM | What is my monthly payment on a 5,000 loan? | Actions | 83 | Loan Amounts | 85 | Periodic amortization ⓘ | 89 | Reviewing Actions ▾ |

FIG. 3A

| | | | | | | |
|---|---|---|---|---|---|---|
| 8/21/2018, 10:37:45 AM | What is my monthly payment on a 5,000 loan? | Actions | 83 | Loan Amounts | 85 | Periodic amortization (?) | 89 | Reviewing Actions ▾ |
| 8/22/2018, 9:23:44 AM | I'd like to confirm that I may modify this withdrawal scheduled payment any time in the future | Actions | 83 | Withdrawal payment | 86 | 5.42 - Can I Change Recurring Withdrawal Answer (?) | 80 | Reviewing Actions ▾ |
| 8/21/2018, 4:51:45 AM | Can I set up period payments from my retirement account? | Actions | 83 | Withdrawal payment | 86 | Can I Set Periodic Payments Answer (?) | 96 | Reviewing Actions ▾ |
| 8/22/2018, 4:22:45 AM | Now would like to withdraw the funds I have in my TIAA account. | Actions | 83 | Withdrawal Eligibility | 88 | Cash Withdrawal Eligibility Answer - 5.01 (?) | 89 | Reviewing Actions ▾ |
| 8/20/2018, 6:17:46 AM | loan available | Actions | 83 | Loan Eligibility | 91 | Loan Eligibility Answer (?) | 86 | Reviewing Actions ▾ |
| 8/21/2018, 5:20:45 AM | HOW DO I WITHDRAWL EVERYTHING | Actions | 83 | Withdrawal Request | 94 | How to withdraw money - answer - 5.10 (?) | 96 | Reviewing Actions ▾ |
| 8/23/2018, 3:09:44 AM | Please advise me on what I will need to do | Actions | 83 | Withdrawal Request | 80 | How to withdraw money - answer - (?) | 96 | Reviewing Actions ▾ |

Cancel [Return to Sessions] [Start Training]

FIG. 3B

SUPERVISED MACHINE LEARNING FOR AUTOMATED ASSISTANTS

REFERENCE TO RELATED APPLICATIONS

The present application claims the benefit of priority under 35 U.S.C. § 119 to Indian Patent Application No. 202041021738 filed on May 23, 2020, the disclosure of which is incorporated by reference herein.

TECHNICAL FIELD

The present disclosure is generally related to distributed computer systems, and is more specifically related to methods and systems of supervised machine learning for automated assistants.

BACKGROUND

Automated assistants (such as chat bots, automated voice response systems, etc.) may interact with users in a natural language (e.g., English, French, Italian, etc.). In an illustrative example, an automated assistant may be employed by an application (e.g., a web-based application, a downloadable smartphone application, or an interactive voice response system accessible via a public telephone network) that is provided by a financial institution to its existing and/or potential customers to perform various financial account management operations and/or financial transactions.

Examples of financial institutions include, but are not limited to, banks, building societies, credit unions, trust companies, mortgage loan companies, insurance companies, investment banks, underwriters, brokerage firms, etc. Examples of financial accounts include, but are not limited to, checking accounts, savings accounts, loan accounts, revolving credit accounts, investment accounts, brokerage accounts, retirement accounts, annuity accounts, etc.

BRIEF DESCRIPTION OF THE DRAWINGS

The present disclosure is illustrated by way of examples, and not by way of limitation, and may be more fully understood with references to the following detailed description when considered in connection with the figures, in which:

FIGS. 3A-3B schematically illustrate an example automated assistant transcript utilized by the methods and systems of the present disclosure;

DETAILED DESCRIPTION

Figure 1:
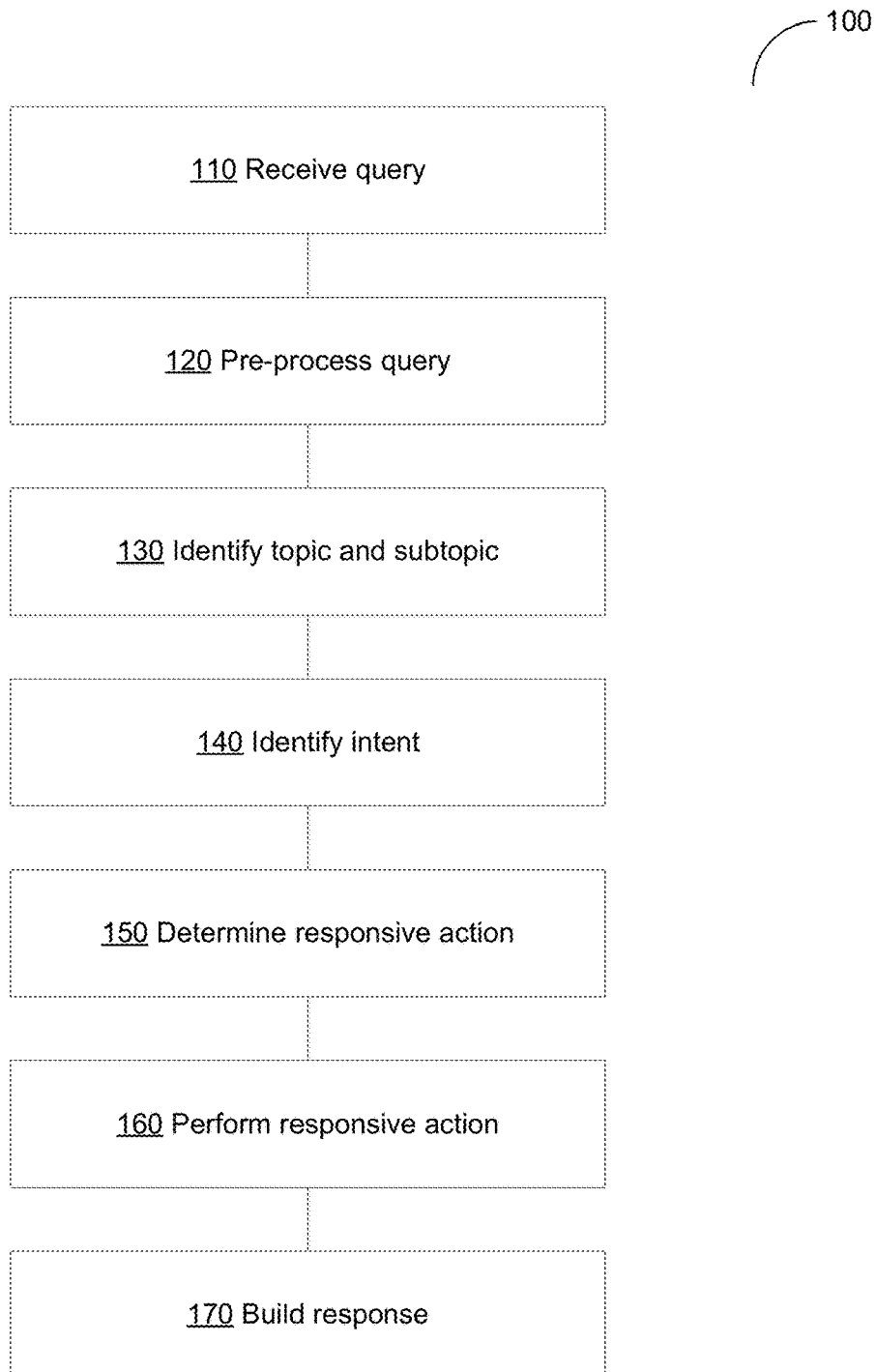
FIG. 1 depicts a flow diagram of an example method of servicing queries by an automated assistant operating in accordance with one or more aspects of the present disclosure.

Described herein are methods and systems of supervised machine learning for automated assistants.

In an illustrative example, an automated assistant (e.g., a chat bot or an interactive voice response system) may analyze a received query in order to associate it with a topic and a subtopic and identify the user's intent. In certain implementations, analyzing the query in order to identify the topic and subtopic and identifying the user's intent may be performed by machine learning-based models. The automated assistant may then identify (e.g., by applying a set of rules to the identified intent and to certain query metadata items) and perform a responsive action corresponding to the identified intent. Upon performing the responsive action, the automated assistant may produce a response and return it to the requesting client, as described in more detail herein below.

The machine learning-based models employed by the automated assistant may be trained by automated workflows implemented in accordance with one or more aspects of the present disclosure. In an illustrative example, a model training platform may initiate a model training session by importing an automated assistant transcript, which may include a set of records reflecting user interactions with an automated assistant. Each record may include the user's query, its classification by the automated assistant (e.g., by assigning a topic and a subtopic to each query), the user's intent inferred by the automated assistant from the query based on the assigned topic and subtopic, and the responsive action inferred by the automated assistant from the query based on the identified user's intent.

The model training platform may then receive graphical user interface (GUI) input reflecting modifications made by the transcript reviewer to one or more fields of each transcript record and/or approval of the transcript record. In particular, the transcript reviewer may review, edit, and accept the topic, subtopic, intent, and/or the action fields. Responsive to receiving a user input indicating an approval of a transcript record, the model training platform may perform a record verification procedure to compare the user-approved record with existing records in an attempt to detect classification conflicts in which two or more records having substantially similar classification features would be associated with different classification categories (e.g., two or more semantically-similar queries would be assigned different topics, subtopics, intents, and/or responsive actions). Should one or more conflicting transcript records be detected, the transcript reviewer may be alerted by an error message, which may include at least parts of the conflicting transcript records. Responsive to detecting one or more conflicting transcript records, the transcript reviewer may be given an option to modify a conflicting transcript record, after which the record verification procedure will be repeated for the modified transcript record. Alternatively, the transcript reviewer may choose to exclude the conflicting data item from the training data set. The approved records may be appended to an existing or new training data set, which may be utilized to train the models to be employed by automated assistants.

Supervised model training may involve running the model on a data sample from a training data set, comparing the actual model output with the desired model output (e.g., the subtopic and the corresponding confidence score, the topic and the corresponding confidence score, or the intent and the corresponding confidence score), and adjusting values of one or more model parameters responsive to determining that the difference of the actual and desired model output exceeds a specified threshold classification error. In certain implementations, one or more validation data sets may be employed to validate the trained model in order to avoid the model overfitting (e.g., closely following the training data set while showing significant errors on other data points).

Significant deviations of the chosen quality metric from the desired value range may be indicative of model imbalances, which may be caused, e.g., by imbalances in the training data set (i.e., significantly different numbers of data items being associated with the classification categories of the predetermined set of categories, thus resulting in one or more categories being underrepresented and/or overrepresented in the training data set). In an illustrative example, a training data set may include a large number of data items associated with one topic, with significantly smaller numbers of data items associated with other topics. In another illustrative example, a training data set may include a small number of data items associated with one topic, with significantly larger numbers of data items associated with other topics.

Responsive to detecting significant model imbalances, the model training platform may retrain one or more models using additional training data sets. The model retraining operations may be iteratively repeated until the detected model imbalance would satisfy a specified model imbalance threshold.

Responsive to successfully evaluating the model, the model training platform may publish the model to a model deployment environment. Publishing a model may involve storing the model in a designated depository and notifying the deployment workflows associated with the respective deployment environments of the model identifiers in the repository, as described in more detail herein below.

Various aspects of the methods and systems are described herein by way of examples, rather than by way of limitation. The methods described herein may be implemented by hardware (e.g., general purpose and/or specialized processing devices, and/or other devices and associated circuitry), software (e.g., instructions executable by a processing device), or a combination thereof.

FIG. 1 depicts a flow diagram of an example method 100 of servicing queries by an automated assistant operating in accordance with one or more aspects of the present disclosure. Method 100 and/or each of its individual functions, routines, subroutines, or operations may be performed by one or more general purpose and/or specialized processing devices. Two or more functions, routines, subroutines, or operations of method 100 may be performed in parallel or in an order that may differ from the order described above. In certain implementations, method 100 may be performed by a single processing thread. Alternatively, method 100 may be performed by two or more processing threads, each thread executing one or more individual functions, routines, subroutines, or operations of the method. In an illustrative example, the processing threads implementing method 100 may be synchronized (e.g., using semaphores, critical sections, and/or other thread synchronization mechanisms). Alternatively, the processing threads implementing method 100 may be executed asynchronously with respect to each other. In an illustrative example, method 100 may be implemented by one or more example computer systems 600 of FIG. 6.

At block 110, a computer system implementing the automated assistant may receive a query. In an illustrative example, for voice-controlled automated assistants, the query may be represented by one or more user's speech fragments. In another illustrative example, for chat bots, short messaging service (SMS) bots, and/or other automated assistants that use text-based user interfaces, the query may be represented by a text message.

At block 120, the computer system may pre-process the query. In an illustrative example, for voice-controlled automated assistants, pre-processing the query may involve translating one or more user's speech fragments into corresponding fragments of a natural language text representing the query. In another illustrative example, for chat bots, short messaging service (SMS) bots, and/or other automated assistants that use text-based user interfaces, pre-processing the query may involve parsing the message in order to extract relevant parts. In certain implementations, pre-processing the query may involve identifying and storing the query metadata in association with the query. The query metadata may include, e.g., an identifier of the user, the timestamp, etc.

At block 130, the computer system may analyze the textual representation of the query in order to associate it with a topic and a subtopic. In certain implementations, analyzing the query in order to identify the topic and subtopic may be performed by machine learning-based models. Each model may be represented by a function that produces a degree of association of an object represented by a vector of classification feature values with certain categories of a predetermined set of categories. Accordingly, each query may be characterized by a corresponding vector of classification feature values. In an illustrative example, the classification features may reflect occurrences in the query of certain words from a specified dictionary. Thus, a classification feature vector for a given query would be represented by an ordered sequence of elements, in which each element represents the number of occurrences in the query of the word identified by the index of the element. In other implementations, various other sets of classification features may be employed.

Therefore, one or more models may be employed to identify a topic of the query, such that for each topic of a predetermined set of topics, a corresponding model would produce a degree of association of the query with the topic. Upon computing the classification feature values for the query and running all the models for the computed feature values, the automated assistant may identify the maximum degree of association among the values produced by the models and may assign to the user query the topic associated with the model that has produced the maximum degree of association. The computed degree of association would represent the confidence score associated with the identified topic. In an illustrative example, if model 1 reflecting the degree of association of an input query with topic A yields, for a given query, the value of 0.7, model 2 reflecting the degree of association of the input query with topic B yields, for the same query, the value of 0.5, and model 3 reflecting the degree of association of an input query with topic C yields, for the same query, the value of 0.8, the query would be associated with topic C with the confidence score of 0.8.

In a similar manner, one or more models may be employed for identifying a subtopic of the query. The automated assistant may identify a plurality of models associated with the identified topic, such that each model would produce a degree of association of the query with a subtopic of a predetermined set of subtopics. The automated assistant may then run all the identified models for the set of classification feature values representing the query in order to identify the maximum degree of association among the values produced by the models. The automated assistant may then assign to the user query the subtopic associated with the model that has produced the maximum degree of association. The computed degree of association would represent the confidence score associated with the identified subtopic.

At block 140, the computer system may identify the user's intent. In certain implementations, analyzing the query in order to identify the user's intent may be performed by machine learning-based models. Accordingly, one or more models may be employed to assign an intent to the query. The automated assistant may identify a plurality of models associated with the identified topic and subtopic, such that each model would produce a degree of association of the query with an intent of a predetermined set of intents. The automated assistant may then run all the identified models for the set of feature values representing the query in order to identify the maximum degree of association among the values produced by the models. The automated assistant may then assign to the user query the intent associated with the model that has produced the maximum degree of association. The computed degree of association would represent the confidence score associated with the identified intent.

At block 150, the computer system may determine a responsive action corresponding to the identified intent. In certain implementations, the responsive action may be identified by applying a set of rules to the identified intent and to certain query metadata items (such as the user identifier). In an illustrative example, the identified intent may be "account balance inquiry," and the parameters of the query may further identify one or more accounts to which the intended action should be applied.

At block 160, the computer system may perform the identified responsive action, which may involve performing one or more operations on one or more accounts associated with the user (e.g., executing one or more database queries to compute the account balance for one or more accounts associated with the user). The result of performing the action may be translated into one or more fragments of natural language text.

At block 170, the computer system may produce a response. In an illustrative example, for voice-controlled automated assistants, producing the response may involve translating the natural language text generated at block 160 to one or more speech fragments. In another illustrative example, for chat bots, short messaging service (SMS) bots, and/or other automated assistants that use text-based user interfaces, producing the response may involve incorporating the natural language text generated at block 160 into a message to be returned to the user.

Upon performing the operations of block 170, the method may terminate.

The above-referenced models employed to identify the topic, subtopic, intent, and responsive action may utilize a variety of automatic classification methodologies, such as Bayesian classifiers, support vector machines (SVMs), random forest classifiers, gradient boosting classifiers, neural networks, etc. Supervised training of a model may involve adjusting, based on example input-output pairs, one or more parameters of a model that maps an input (e.g., a vector of feature values characterizing an object) to an output (e.g., a category of a predetermined set of categories).

Supervised model training may utilize one or more training data sets. Each training data set includes a plurality of data items, such that each data item specifies a set of classification feature values for an object (e.g., represented by a vector, each element of which represents the number of occurrences in the query of the word identified by the index of the element) and a corresponding classification of the object (e.g., represented by the confidence score associated with a topic of the query). Supervised model training may involve running the model on the data items from the training data set, comparing the actual model output with the desired model output (i.e., the category and the corresponding confidence score associated with the data item by the training data set), and adjusting values of one or more model parameters responsive to determining that the value of a predetermined quality metric exceeds a specified threshold value.

In an illustrative example, the quality metric may be represented by the F-measure, which may be defined as follows:

$$F=2*(Precision*Recall)/(Precision+Recall),$$

where $Precision=t/(t+f_p)$ and $Recall=t/(t+f_n)$, $t$ is the number of true positive outcomes (correctly classified objects), $f_p$ is the number of false positive outcomes (i.e., an object that does not belong to a certain category has been classified as belonging to that category), and $f_n$ is the number of false negative outcomes (i.e., an object belonging to a certain category has not been classified as belonging to that category).

In various other implementations of the systems and methods described herein, other quality metrics may be employed.

Figure 2:
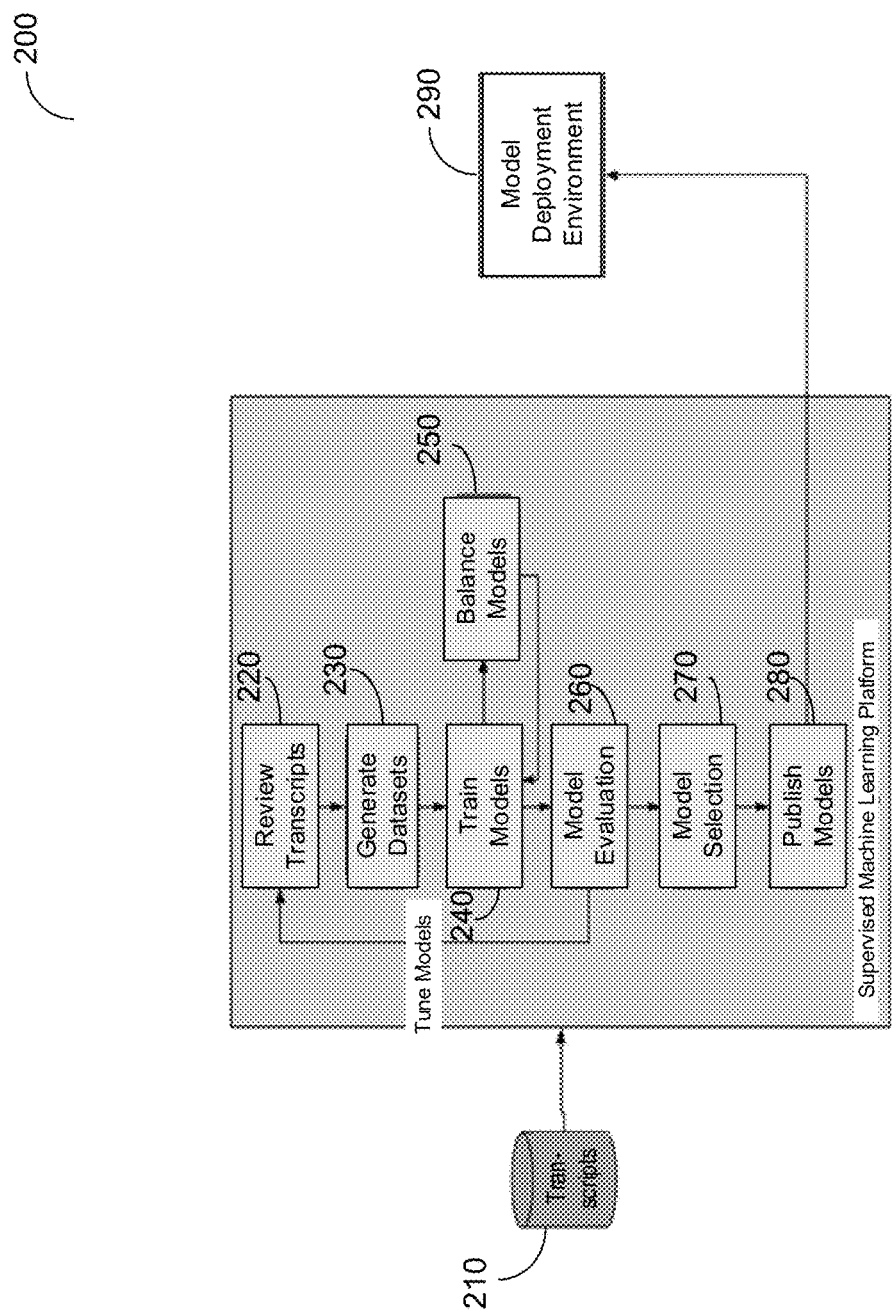
FIG. 2 depicts a flow diagram of an example method implementing a workflow of supervised machine learning for automated assistants in accordance with one or more aspects of the present disclosure.

In accordance with one or more aspects of the present disclosure, supervised training of machine learning-based models employed by automated assistants may be managed by automated workflows. FIG. 2 depicts a flow diagram of an example method 200 implementing a workflow of supervised machine learning for automated assistants in accordance with one or more aspects of the present disclosure. Method 200 and/or each of its individual functions, routines, subroutines, or operations may be performed by one or more general purpose and/or specialized processing devices. Two or more functions, routines, subroutines, or operations of method 200 may be performed in parallel or in an order that may differ from the order described above. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processing threads implementing method 200 may be executed asynchronously with respect to each other. In an illustrative example, a model training platform implementing method 200 may include one or more example computer systems 600 of FIG. 6.

Referring to FIG. 2, the model training workflow may be initiated by importing an automated assistant transcript 210. An example automated assistant transcript 210 may be represented by a file including a set of records 310A-310N reflecting user interactions with an automated assistant, as schematically illustrated by FIGS. 3A-3B. Each record may include the user's query, its classification by the automated assistant (e.g., by assigning a topic and a subtopic to each query), the user's intent inferred by the automated assistant from the query based on the assigned topic and subtopic, and the responsive action inferred by the automated assistant from the query based on the identified user's intent.

In the illustrative example of FIGS. 3A-3B, each record 310 includes the timestamp 315, the user input field 320, the topic field 325, the topic score field 330, the subtopic field 335, the subtopic score field 340, the inferred intent field 345, the intent score field 350, and/or the action field 355. The user input field 320 stores the text of the query, which may be directly provided by the user (e.g., via a text-based user interface) or produced by voice-to-text conversion (if the voice-controlled user interface has been utilized). The topic field 325 stores an identifier of the topic that the automated assistant has associated with the query. The topic score field 330 stores a value indicative of the confidence level of the topic having been identified correctly. The subtopic field 335 stores an identifier of the subtopic that the automated assistant has associated with the query. The subtopic score field 340 stores a value indicative of the confidence level of the subtopic having been identified correctly. The intent field 345 stores an identifier of the intent that the automated assistant has associated with the query. The intent score field 350 stores a value indicative of the confidence level of the intent having been identified correctly. The action field 355 stores an identifier of the action that the automated assistant has associated with the query.

Referring again to FIG. 2, at block 220, the model training platform may receive graphical user interface (GUI) input reflecting modifications by the transcript reviewer of one or more fields of each transcript record and/or approval of the transcript record. In particular, the transcript reviewer may reject, edit, and/or accept the content of the topic field 325, the subtopic field 335, the intent field 345, and the action field 355. In certain implementations, responsive to receiving a user input indicating an approval of a transcript record, the model training platform may perform a record verification procedure with respect to the user-approved transcript record. The record verification procedure may compare the user-approved record with existing records in an attempt to detect classification conflicts, in which two or more records having substantially similar classification features would be associated with different classification categories (e.g., two or more semantically-similar queries would be assigned different topics, subtopics, intents, or responsive actions). Should one or more conflicting transcript records be detected, the transcript reviewer may be alerted by an error message, which may include at least parts of the conflicting transcript records. The training dataset verification procedure is described in more detail herein below with reference to FIG. 4. Responsive to detecting one or more conflicting transcript records, the transcript reviewer may be given an option to modify a conflicting transcript record, after which the record verification procedure will be repeated for the modified transcript record. Alternatively, the transcript reviewer may choose to exclude the conflicting data item from the training data set.

At block 230, the model training platform may generate the training data sets. In an illustrative example, one or more records that have been approved by the records reviewer at block 220 may be appended to an existing or a new data set. In certain implementations, a data set may be designated as a training data set or a validation data set.

At block 240, the model training platform may train one or more models using the training data sets generated at block 230. As noted herein above, supervised model training may involve running the model on a data sample from a training data set, comparing the actual model output with the desired model output (e.g., the subtopic and the corresponding confidence score, the topic and the corresponding confidence score, or the intent and the corresponding confidence score), and adjusting values of one or more model parameters responsive to determining that the difference of the actual and desired model output exceeds a specified threshold classification error. In certain implementations, one or more validation data sets may be employed to validate the trained model in order to avoid the model overfitting (e.g., closely following the training data set while showing significant errors on other data points).

Significant deviations of the chosen quality metric from the desired value range may be indicative of model imbalances. In an illustrative example, a detected deviation of the value of the F-measure from the target value of 1 by more than a predetermined threshold value may be indicative of the precision or recall being too low or too high. Accordingly, varying the threshold deviation value would fine-tune the tolerance of the model training workflow to model imbalances.

Model imbalances may be caused, e.g., by imbalances in the training data set (i.e., significantly different numbers of data items being associated with the classification categories of the predetermined set of categories, thus resulting in one or more categories being underrepresented and/or overrepresented in the training data set). In an illustrative example, a training data set may include a large number of data items associated with one topic, with significantly smaller numbers of data items associated with other topics. In another illustrative example, a training data set may include a small number of data items associated with one topic, with significantly larger numbers of data items associated with other topics.

Responsive to detecting model imbalances, the model training platform may, at block 250, retrain one or more models using additional training data sets generated at block 230. The model retraining operations of block 250 may be iteratively repeated until the detected model imbalance would satisfy a specified model imbalance threshold.

Responsive to successfully evaluating the model at block 260, the model training platform may, at block 270, receive, via a GUI, the user's selection of one or more models to be published. Evaluating the model may involve running the model on the data items of the validation data set, evaluating the quality metric reflecting the difference between the actual output (produced by the model) and the desired output (specified by the validation data set), and ascertaining that the quality metric value falls within a desired range.

At block 280, the model training platform may publish the selected models to the model deployment environment 290. Publishing the models may involve storing the models in a designated depository and notifying the deployment workflows associated with the respective deployment environments of the model identifiers in the repository. Responsive to completing the operations of block 280, the workflow may terminate.

As noted herein above, responsive to receiving a user input indicating an approval of a transcript record, the model training platform may perform a record verification procedure with respect to the user-approved transcript record. The record verification procedure may compare the user-approved record with existing records in an attempt to detect classification conflicts, in which two or more records having substantially similar classification features would be associated with different classification categories (e.g., two or more semantically-similar queries would be assigned different topics, subtopics, intents, or responsive actions). Should one or more conflicting transcript records be detected, the transcript reviewer may be alerted by an error message, which may include at least parts of the conflicting transcript records.

Figure 4:
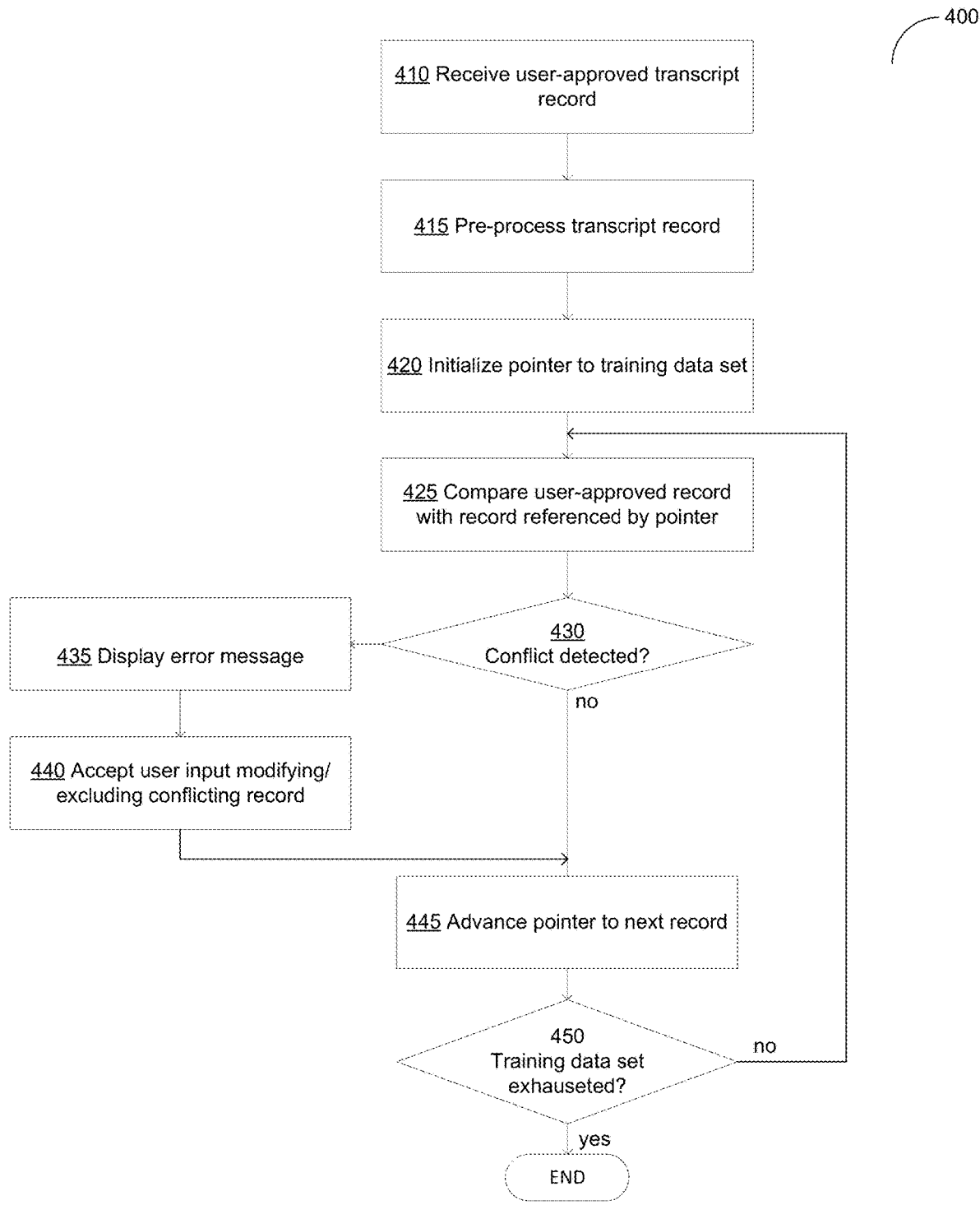
FIG. 4 depicts a flow diagram of an example method of transcript record verification, in accordance with one or more aspects of the present disclosure.

FIG. 4 depicts a flow diagram of an example method 400 of transcript record verification, in accordance with one or more aspects of the present disclosure. Method 400 and/or each of its individual functions, routines, subroutines, or operations may be performed by one or more general purpose and/or specialized processing devices. Two or more functions, routines, subroutines, or operations of method 400 may be performed in parallel or in an order that may differ from the order described above. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other. In an illustrative example, a model training platform implementing method 400 may include one or more example computer systems 600 of FIG. 6.

At block 410, the model training platform implementing the method may receive a user-approved transcript record.

At block 415, the model training platform may pre-process the transcript record, e.g., by removing punctuation symbols and/or extra white spaces. In certain implementations, the pre-processing operation may further involve removing from the transcript record certain words that are deemed to convey no or insignificant semantic information (e.g., certain parts of speech; e.g., articles, and/or words from a predetermined list of words) or words that are deemed to convey the account-identifying information (such as account names, numbers, etc.) or date ranges.

At block 420, the model training platform may initialize the current data item pointer to point to the first data item of the training data set.

At block 425, the model training platform may compare the user-approved transcript record with the data item referenced by the current data item pointer. In an illustrative example, the comparison may involve computing a vector of the classification feature values of the user's approved transcript record and comparing the computed vector with the feature vector representing the data item referenced by the current data item pointer. As noted herein above, the feature vector may be represented by an ordered sequence of elements, in which each element represents the number of occurrences in the query of a word identified by the index of the element. In other implementations, various other sets of classification features may be employed. In another illustrative example, the operations of block 425 may involve comparing the words of the user-approved data item with words of the data item referenced by the current data item pointer, while allowing for synonymic substitutions in any of the two data items being compared.

Responsive to detecting, at block 430, a conflict between the user-approved transcript record and the data item referenced by the current data item pointer, the method may branch to block 435; otherwise, the processing may continue at block 445. In an illustrative example, a conflict is detected if at least two data items having substantially similar classification features are found to be associated with different classification categories (e.g., two or more semantically-similar queries would be assigned different topics, subtopics, intents, or responsive actions).

At block 435, the model training platform may display an error message informing the transcript reviewer of the detected conflict.

At block 440, the model training platform may accept the user's input modifying the conflicting transcript record or removing the conflicting transcript record from the training data set.

At block 445, advance the current data pointer to point to the next data item of the training data set.

Responsive to determining at block 450 that the training data set has not been exhausted, the method loops back to block 425; otherwise, the method may terminate.

Figure 5:
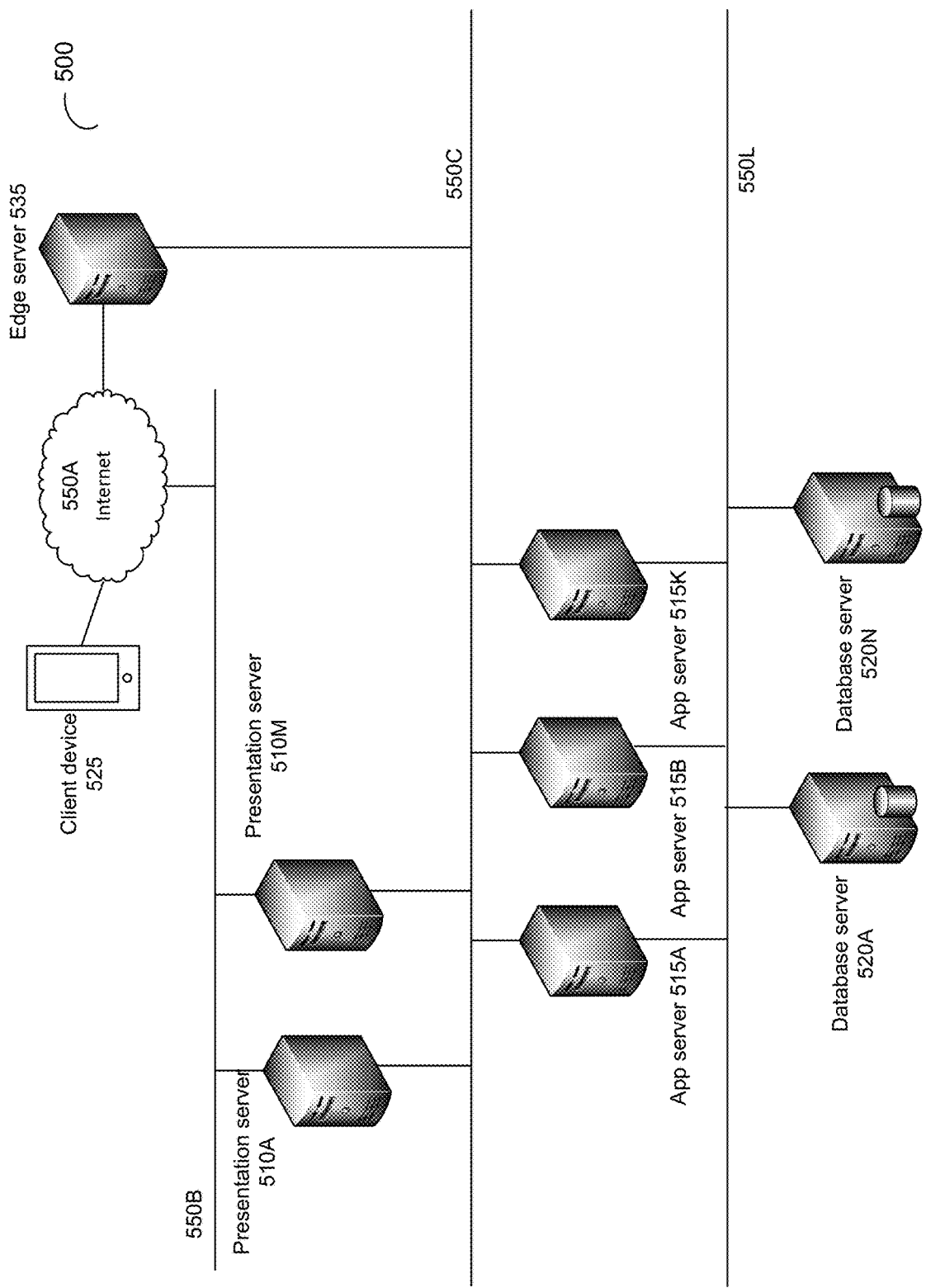
FIG. 5 schematically illustrates a high-level network diagram of an example distributed computer system 500, which may implement the methods described herein.

FIG. 5 schematically illustrates a high-level network diagram of an example distributed computer system 500, which may implement the methods described herein. Servers, appliances, and network segments are shown in FIG. 5 for illustrative purposes only and do not in any way limit the scope of the present disclosure. Various other servers, components, appliances, and/or methods of their interconnection may be compatible with the methods and systems described herein. Firewalls, load balancers, network switches and various other networking components may be omitted from FIG. 5 for clarity and conciseness.

The example distributed computer system 500 may include one or more presentation servers 510A-510M, application servers 515A-515K, database servers 520A-520N, and/or various other servers. The example distributed computer system 500 may be configured to service requests initiated by a plurality of geographically distributed client devices 525.

Requests initiated by a client device 525 (e.g., a laptop, a desktop computer, a smartphone, a tablet, or some other mobile communication device) may be routed over one or more networks 550A-550L, to an edge server 535, which may then select, e.g., based on a load balancing scheme, a presentation server 510 to which the client request should be forwarded. In addition to performing the load balancing, edge servers 535 may serve static content in response to client HTTP requests and/or perform various other tasks.

In an illustrative example, a plurality of edge servers 535 may be geographically distributed so that a request initiated by the client device 525 would be routed to an edge server 535, which is selected based on the client geographic location and/or other request parameters. The edge server 535 may then forward the client-initiated request to a presentation server 510, which may be selected, e.g., by implementing a round robin scheme or a load balancing mechanism. The presentation server 510 may, upon parsing the request, issue one or more requests to one or more application servers 515A-515K configured to implement various automated assistant functions (e.g., voice recognition, information extraction, request processing, model training, etc.). An application server 515 may process a request received from a presentation server 510 and produce a response to be returned to the client device 525. The request processing by the application server 515 may comprise issuing one or more requests to one or more database servers 520A-520N. The presentation server 510 may then wrap the response produced by the application server 515 into one or more HTTP response messages and return the response messages to the client device 525 (e.g., via an edge server 535).

The above-described architecture of the example distributed computer system 500 serves as an illustrative example only and does not in any way limit the scope of the present disclosure. References herein to presentation servers, application servers, database servers, and/or other components of example distributed computer systems are purely functional, as a single hardware system or a single software component may implement functions of one or more functional components that are described or referenced herein. Various other system architectures may be compatible with the methods and systems implemented in accordance with one or more aspects of the present disclosure.

Figure 6:
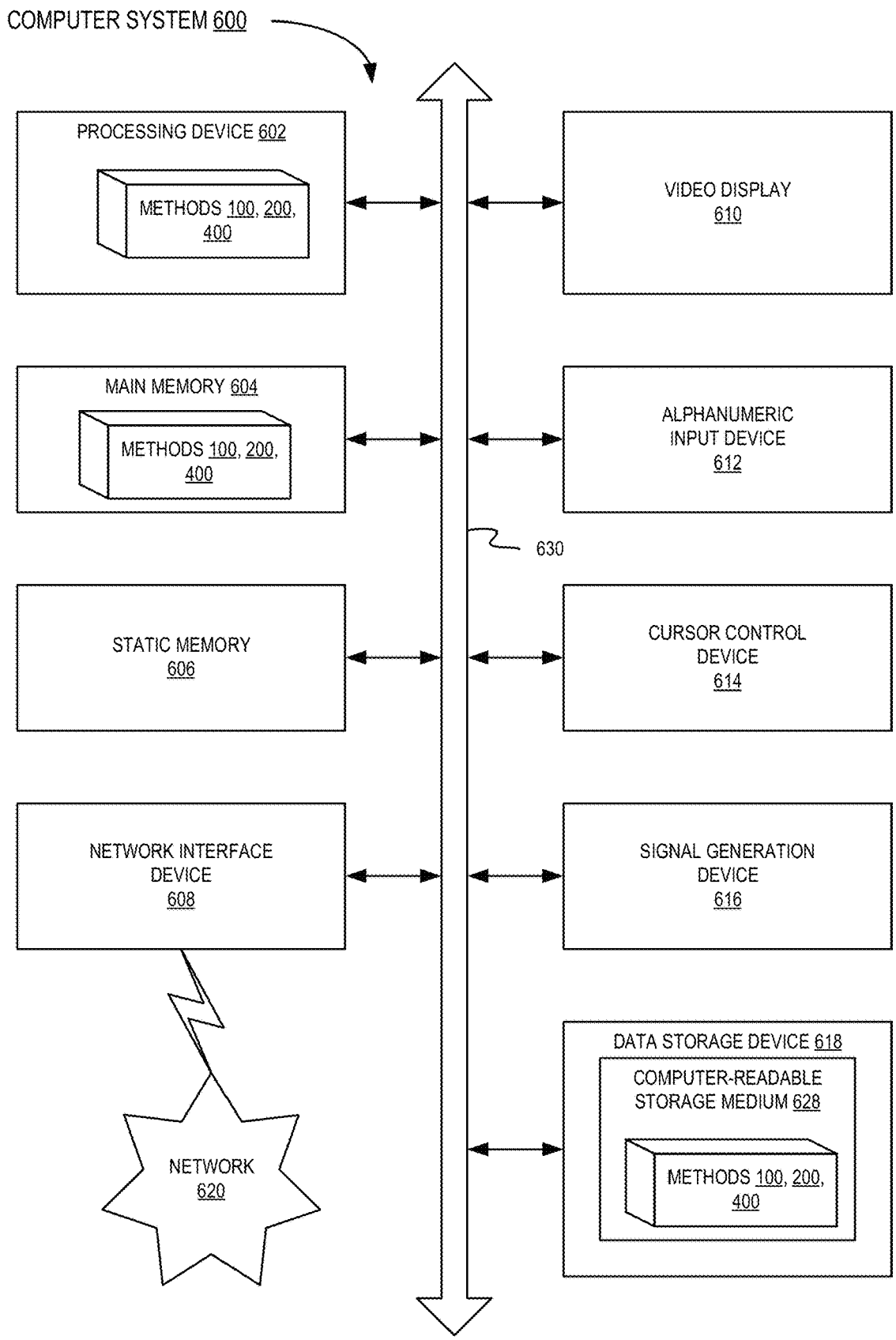
FIG. 6 illustrates a diagrammatic representation of a computer system that may be employed to implement the methods described herein.

FIG. 6 illustrates a diagrammatic representation of a computer system 600, which may be employed for implementing the methods described herein. The computer system 600 may be connected to other computing devices in a LAN, an intranet, an extranet, and/or the Internet. The computer system 600 may operate in the capacity of a server machine in a client-server network environment. The computer system 600 may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computer system" shall also be taken to include any collection of computing devices that individually or jointly execute a set (or multiple sets) of instructions to perform the methods discussed herein. In illustrative examples, the computer system 600 may represent one or more servers of the distributed computer system 500 implementing the above-described methods 100, 200, and/or 400 of supervised machine learning for automated assistants.

The example computer system 600 may include a processing device 602, a main memory 604 (e.g., synchronous dynamic random access memory (DRAM), read-only memory (ROM)), and a static memory 606 (e.g., flash memory and a data storage device 618), which may communicate with each other via a bus 630.

The processing device 602 may be provided by one or more general-purpose processing devices such as a microprocessor, central processing unit, or the like. In an illustrative example, the processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also comprise one or more special-purpose processing devices such as an application specific integrated circuit (ASIC), a field programmable gate array (FPGA), a digital signal processor (DSP), a network processor, or the like. The processing device 602 may be configured to execute the methods 100, 200, and/or 400 of supervised machine learning for automated assistants, in accordance with one or more aspects of the present disclosure.

The computer system 600 may further include a network interface device 608, which may communicate with a network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and/or an acoustic signal generation device 616 (e.g., a speaker). In one embodiment, video display unit 610, alphanumeric input device 612, and cursor control device 614 may be combined into a single component or device (e.g., an LCD touch screen).

The data storage device 618 may include a computer-readable storage medium 628 on which may be stored one or more sets of instructions (e.g., instructions of the methods 100, 200, and/or 400 of supervised machine learning for automated assistants, in accordance with one or more aspects of the present disclosure) implementing any one or more of the methods or functions described herein. The may also reside, completely or at least partially, within main memory 604 and/or within processing device 602 during execution thereof by computer system 600, main memory 604 and processing device 602 also constituting computer-readable media. The instructions may further be transmitted or received over a network 620 via network interface device 608.

While computer-readable storage medium 628 is shown in an illustrative example to be a single medium, the term "computer-readable storage medium" shall be taken to include a single medium or multiple media (e.g., a centralized or distributed database and/or associated caches and servers) that store one or more sets of instructions. The term "computer-readable storage medium" shall also be taken to include any medium that is capable of storing, encoding or carrying a set of instructions for execution by the machine and that causes the machine to perform the methods described herein. The term "computer-readable storage medium" shall accordingly be taken to include, but not be limited to, solid-state memories, optical media and magnetic media.

Unless specifically stated otherwise, terms such as "identifying," "determining," or the like refer to actions and processes performed or implemented by computing devices that manipulate and transform data represented as physical (electronic) quantities within the computing device's registers and memories into other data similarly represented as physical quantities within the computing device registers or memories or other such information storage, transmission or display devices.

Examples described herein also relate to an apparatus for performing the methods and systems described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method, comprising:
   receiving, by a computer system, an automated assistant transcript comprising a plurality of records, wherein each record of the plurality of records comprises a query, a classification of the query, an intent associated with the query, and a responsive action associated with the intent;

receiving, via a graphical user interface (GUI), a user input indicating an approval of a new automated assistant transcript record;

comparing the new automated assistant transcript record to one or more records of the plurality of records;

detecting a conflict of the new automated assistant transcript record with an existing record of the plurality of records;

displaying, via the GUI, a notification of the conflict;

responsive to receiving, via the GUI, a user input modifying one or more fields of the new automated assistant transcript record, appending the new automated assistant transcript record to the automated assistant transcript; and utilizing the automated assistant transcript for training a first set of classification models, a second set of classification models, and a third set of classification models, wherein each classification model of the first set of classification models is employed to determine a degree of association of an input query with a topic of a predefined set of topics, wherein each classification model of the second set of classification models is employed to determine a degree of association of the input query with a subtopic of a predefined set of subtopics associated with a specified topic, and wherein each classification model of the third set of classification models is employed to determine a degree of association of the input query with an intent of a predefined set of intents associated with the specified topic and a specified subtopic.

2. The method of claim 1, further comprising:

responsive to failing to detect a conflict of the new automated assistant transcript record with the plurality of records, appending the new automated assistant transcript record to the automated assistant transcript.

3. The method of claim 1, further comprising:

validating the classification models; and publishing the classification models to a model deployment environment.

4. The method of claim 3, wherein validating a classification model further comprises:

running the classification model on a plurality of data items of a validation data set;

evaluating a quality metric reflecting a difference between an actual output of the classification model and a desired output of the classification model; and determining whether the quality metric value falls within a predetermined range.

5. The method of claim 1, wherein comparing the new automated assistant transcript record to one or more records further comprises:

computing values of one or more classification features associated with the new automated assistant transcript record.

6. The method of claim 1, wherein the query is represented by a vector of classification features, wherein each element of the vector represents a number of occurrences in the query of a word identified by an index of the element.

7. The method of claim 1, wherein the query is associated with a parameter identifying an object of an action identified by the intent.

8. A system, comprising:

a memory; and a processing device operatively coupled to the memory, wherein the processing device is configured to:

receive an automated assistant transcript comprising a plurality of records, wherein each record of the plurality of records comprises a query, a classification of the query, an intent associated with the query, and a responsive action associated with the intent;

receive, via a graphical user interface (GUI), a user input indicating an approval of a new automated assistant transcript record;

compare the new automated assistant transcript record to one or more records of the plurality of records;

detect a conflict of the new automated assistant transcript record with an existing record of the plurality of records;

display, via the GUI, a notification of the conflict;

responsive to receiving, via the GUI, a user input rejecting the new automated assistant transcript record, discard the new automated assistant transcript record; and utilize the automated assistant transcript for training a first set of classification models, a second set of classification models, and a third set of classification models, wherein each classification model of the first set of classification models is employed to determine a degree of association of an input query with a topic of a predefined set of topics, wherein each classification model of the second set of classification models is employed to determine a degree of association of the input query with a subtopic of a predefined set of subtopics associated with a specified topic, and wherein each classification model of the third set of classification models is employed to determine a degree of association of the input query with an intent of a predefined set of intents associated with the specified topic and a specified subtopic.

9. The system of claim 8, wherein the processing device is further configured to:

responsive to failing to detect a conflict of the new automated assistant transcript record with the plurality of records, append the new automated assistant transcript record to the automated assistant transcript.

10. The system of claim 8, wherein the processing device is further configured to:

validate the classification models; and publish the classification models to a model deployment environment.

11. The system of claim 10, wherein validating a classification model further comprises:

running the classification model on a plurality of data items of a validation data set;

evaluating a quality metric reflecting a difference between an actual output of the classification model and a desired output of the classification model; and determining whether the quality metric value falls within a predetermined range.

12. The system of claim 8, wherein comparing the new automated assistant transcript record to one or more records further comprises:

computing values of one or more classification features associated with the new automated assistant transcript record.

13. The system of claim 8, wherein the processing device is further configured to:

receive, via the GUI, a user input modifying one or more fields of the new automated assistant transcript record.

14. The system of claim 8, wherein the query is represented by a vector of classification features, wherein each element of the vector represents a number of occurrences in the query of a word identified by an index of the element.

15. A non-transitory computer-readable storage medium comprising executable instructions which, when executed by a computer system, cause the computer system to:
- receive an automated assistant transcript comprising a plurality of records, wherein each record of the plurality of records comprises a query, a classification of the query, an intent associated with the query, and a responsive action associated with the intent;
- receive, via a graphical user interface (GUI), a user input indicating an approval of a new automated assistant transcript record;
- perform verification of the new automated assistant transcript record by comparing the new automated assistant transcript record to one or more records of the plurality of records; and
- responsive to detecting a conflict of the new automated assistant transcript record with an existing record of the plurality of records, display, via the GUI, a notification of the conflict;
- responsive to receiving, via the GUI, a user input modifying one or more fields of the new automated assistant transcript record, repeat the verification of the new automated assistant transcript record; and
- utilize the automated assistant transcript for training a first set of classification models, a second set of classification models, and a third set of classification models, wherein each classification model of the first set of classification models is employed to determine a degree of association of an input query with a topic of a predefined set of topics, wherein each classification model of the second set of classification models is employed to determine a degree of association of the input query with a subtopic of a predefined set of subtopics associated with a specified topic, and wherein each classification model of the third set of classification models is employed to determine a degree of association of the input query with an intent of a predefined set of intents associated with the specified topic and a specified subtopic.

16. The non-transitory computer-readable storage medium of claim 15, further comprising executable instructions which, when executed by the computer system, cause the computer system to:
- responsive to failing to detect a conflict of the new automated assistant transcript record with the plurality of records, append the new automated assistant transcript record to the automated assistant transcript.

17. The non-transitory computer-readable storage medium of claim 15, further comprising executable instructions which, when executed by the computer system, cause the computer system to:
- validate the classification models; and
- publish the classification models to a model deployment environment.

18. The non-transitory computer-readable storage medium of claim 15, wherein comparing the new automated assistant transcript record to one or more records further comprises:
- computing values of one or more classification features associate with the new automated assistant transcript record.

19. The non-transitory computer-readable storage medium of claim 15, wherein the query is associated with a parameter identifying an object of an action identified by the intent.

20. The non-transitory computer-readable storage medium of claim 15, wherein the query is represented by a vector of classification features, wherein each element of the vector represents a number of occurrences in the query of a word identified by an index of the element.

* * * * *